US007031385B1

(12) United States Patent
Inoue et al.

(10) Patent No.: US 7,031,385 B1
(45) Date of Patent: Apr. 18, 2006

(54) METHOD AND APPARATUS FOR DETECTING SCENE CHANGE OF A COMPRESSED MOVING-PICTURE, AND PROGRAM RECORDING MEDIUM THEREFOR

(75) Inventors: Yukiko Inoue, Fukuoka (JP); Koji Arimura, Fukuoka-ken (JP); Jun Ikeda, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 929 days.

(21) Appl. No.: 09/677,802

(22) Filed: Oct. 2, 2000

(30) Foreign Application Priority Data

Oct. 1, 1999 (JP) ................................ 11-281716

(51) Int. Cl.
*H04N 7/12* (2006.01)
(52) U.S. Cl. .................. 375/240.08; 382/239; 348/700
(58) Field of Classification Search ........... 375/240.08, 375/240.03, 240.09, 240.12, 240.15; 348/475, 348/699, 700, 415.1; 382/232, 236, 239; 360/8
See application file for complete search history.

(56) References Cited

U.S. PATENT DOCUMENTS

| 5,319,468 | A | * | 6/1994 | Honjo ........................ 382/236 |
| 5,461,420 | A | * | 10/1995 | Yonemitsu et al. ..... 375/240.15 |
| 5,638,124 | A | * | 6/1997 | Soda et al. ............. 375/240.12 |
| 5,642,239 | A | * | 6/1997 | Nagai ............................. 360/8 |
| 6,055,025 | A | * | 4/2000 | Shahraray ................... 348/700 |
| RE37,112 | E | * | 3/2001 | Honjo ......................... 382/236 |
| 6,343,153 | B1 | * | 1/2002 | Kawasaki et al. ........... 382/239 |
| 6,415,059 | B1 | * | 7/2002 | Saunders ..................... 382/239 |

FOREIGN PATENT DOCUMENTS

| JP | 07059108 | 3/1995 |
| JP | 07121555 | 5/1995 |
| JP | 09322120 | 12/1997 |
| JP | 10327387 | 12/1998 |

* cited by examiner

*Primary Examiner*—Gims Philippe
(74) *Attorney, Agent, or Firm*—Darby & Darby

(57) ABSTRACT

An apparatus for detecting a scene change in a compressed moving-picture detects the scene change even if frame structure images and field structure images exist together. The apparatus includes an image structure judging portion for judging the image structure of an inputted compressed moving-picture, a feature quantity extracting portion for extracting a feature quantity based on top and bottom double data in vertical direction of the image with respect to a field structure image when the judgment result of the image structure judging portion is a frame structure image, a data memory for storing the data extracted by the feature quantity extracting portion, an extracted data comparing portion for comparing the extracted data and calculating the quantity of variation of a picture, and a scene change judging portion for judging a scene change by the use of the quantity of variation calculated by the extracted data comparing portion.

12 Claims, 10 Drawing Sheets

FIELD STRUCTURE
IMAGE
FEATURE QUANTITY dt
dt = Dt

FIELD STRUCTURE
IMAGE
FEATURE QUANTITY dt
dt = Dt

FRAME STRUCTURE
IMAGE
FEATURE QUANTITY dt
dt = (Dtu+Dtb)/2

SCENE CHANGED
BETWEEN TWO FIELDS

FRAME DCT

FIELD DCT

METHOD AND APPARATUS FOR DETECTING SCENE CHANGE OF A COMPRESSED MOVING-PICTURE, AND PROGRAM RECORDING MEDIUM THEREFOR

BACKGROUND OF THE INVENTION

This invention relates to an apparatus for detecting the change point of a scene in a compressed moving-picture and relates to the related art.

Recently, the need to handle compressed moving-pictures, such as MPEG (Moving Picture Experts Group) or DV (Digital Video), has increased because of the increased usage of digital video cameras and by the appearance of digital broadcasting. Additionally, a great many analog images of the past are preserved as digital compressed moving-pictures, which again requires the handling of compressed moving-pictures. A technique has come into use for editing such coded compressed moving-pictures without decoding them.

In editing, it is necessarily to be able to quickly and automatically detect a scene change (more specifically, an image change point or a scene change point) in a compressed moving-picture, i.e., a bit stream. The reason is that position information of the first scene of detected scenes or the representative image of scenes cut by the scene change technique is useful as an index of scene content and is an important aid to search or editing of the content.

The encoding of MPEG2, that is widely used as the format of a compressed moving-picture, like it predecessors MPEG1, H.261, uses motion vectors and DCT (Discrete Cosine Transform). In a frame, data are divided into brightness (Y) and color, difference (Cb, Cr). These data and are encoded in macro block units of 16×16 pixels.

In encoding each of the macro blocks, motion compensation prediction in which motion prediction is performed from a reference image is selected or, alternatively, intra-encoding in which encoding is performed only by data for encoding is selected.

Motion compensation prediction is a method in which the encoding percentage rises when the time correlation between frames is high. A prediction error signal is derived from a difference between the data of the macro block to be encoded and the data of the macro block obtained by motion prediction from the reference image and compressed information in time and in space. In motion compensation prediction, the prediction error signal is converted into a space frequency domain by DCT for each block of 8×8 pixels.

On the other hand, intra-encoding is a method in which block data itself to be encoded is divided into each block of 8×8 pixels, and DCT encoding is simply performed for each block.

The unit of encoding in MPEG2 is an interlaced image that is also an object thereof. In addition a frame structure and a field structure each constitute an image-encoding unit.

In the frame structure, two interlaced fields, an odd field and an even field, are subjected to encoding. In the field structure, one field of either the odd field or the even field is subjected to encoding.

In this specification, an image encoded in the frame structure is referred to as "frame structure image", and an image encoded in the field structure is referred to as "field structure image".

Next, motion compensation will be described. As mentioned above, MPEG2 has the frame structure and the field structure. Motion compensation prediction of the frame structure image includes frame prediction, field prediction, and dual-prime prediction. Motion compensation prediction of the field structure image, uses 16×8 MC prediction, and dual-prime prediction. In predictions other than the frame prediction, a selection can be made about whether a reference field is an odd field or an even field.

Referring now to FIGS. 15(a) and 15(b) an encoding method in the frame structure image uses two kinds of DCTs, a frame DCT and a field DCT. As best seen in FIG. 15(a), the frame DCT divides a luminance signal of a macro block into four blocks in which each block is formed by a frame, to which DCT is applied.

On the other hand, as shown in FIG. 15(b), the field DCT divides a luminance signal of a macro block into four blocks in which each block is formed by a field, and thereafter applies DCT to it.

In encoding, either of the two DCTs can be used. Generally, it is known that, when the image data difference between the odd field and the even field is large, the efficiency of encoding is improved by using the field DCT. Especially, when two scenes exist together in one field, the use of the field DCT improves compressibility.

However, in the field DCT, there is a need to divide a frame structure into two fields. This decreases processing speed with respect to the frame DCT. Accordingly, the encoding efficiency of the frame structure image (interlace image) can be improved by appropriately using the two DCTs in accordance with the aforementioned characteristics. For the color-difference signal in the 4:2:0 format, the frame DCT is always used. In the field structure image, the macro block is constructed of only the signal of one field, and therefore the field DCT is always performed.

Based on the above description, a conventional scene change detection technique uses feature quantities of:
(1) histogram of image colors,
(2) data size of a compressed moving-picture,
(3) block data difference between images of two frames at the same position, etc.

(1) Using the histogram of image colors, colors used for an image of one frame are indicated in the histogram in that frame or in a region where one frame is divided. With the histogram as the feature quantity of the frame, a degree of similarity is calculated in comparison with the feature quantities of frame images before and after the frame (see Japanese Unexamined Patent Publication No. Hei-7-59108, for example).

(2) Using the data size of a compressed moving-picture, the data sizes of adjacent frames are, compared by use of the tendency that the compressibility is low at a scene change part, and, when the difference exceeds a predetermined threshold, the judgement that it is a scene change is shown (see Japanese Unexamined Patent Publication No. Hei-7-121555, for example).

In the techniques of (1) and (2), it is only in each frame that the scene change can be detected. Therefore, if the scene change occurs between an odd field and an even field in one frame (i.e., between two fields), the scene change cannot be accurately detected.

To resolve this problem, Japanese Unexamined Patent Publication No. Hei-9-322120 has proposed a method of detecting a scene change without conducting decoding processing from encoded image data using a field prediction method. According to this proposal, in frames to be predicted, a plurality of degrees of similarity between fields are calculated, based on a reference selection field signal by which either the odd field or the even field of a reference frame is selected for prediction, and the scene change is detected from the result. However, this technique cannot be applied to pictures where the field prediction method (between-frames prediction method) is not used or pictures where a picture of the field prediction method and a picture of other prediction methods exist together because it depends on the field prediction method.

(3) Where positional correspondence cannot be taken when the difference of only the DC coefficient in DCT at the same position is used as data. The reason is that, since two kinds of DCTs of the frame DCT and field DCT can be used as the encoding method in the frame structure image, when block data is compared without solving DCT, the 8×8 pixel data in an image and the 8×8 pixel data of either the odd field only or the even field only in the 8×16 pixel data are compared with each other if one of the compared data is encoded by frame DCT and the other data is encoded by field DCT.

In order to improve this, a comparison must be made between a frame structure image of one frame and a field structure image corresponding to one frame (i.e., odd field image and even field image). However, a problem resides in that, according to this, a comparison can be made only when the data of two field structure images are prepared, and therefore processing becomes complex, and processing speed decreases.

OBJECTS AND SUMMARY OF THE INVENTION

It is therefore a first object of the present invention to provide a technique capable of detecting a scene change even when field/frame structures exist together.

It is a second object of the present invention to provide a technique capable of detecting also a scene change that exists between fields of a frame structure.

It is a third object of the present invention to provide a technique capable of quickly detecting a desired scene change when the distance between a start point and an end point is known beforehand.

According to a first aspect of the present invention, a scene change detecting apparatus inputs a compressed moving-picture in which field structure images and frame structure images exist together and detects scene changes in the inputted compressed moving-picture. This makes it possible to detect the scene change without giving special attention to the image structure and thereby to obtain an important index for retrieving the compressed moving-picture.

According to a second aspect of the present invention, the scene change detecting apparatus includes an image structure judging portion for judging an image structure of an inputted compressed moving-picture; a feature quantity extracting portion for extracting a feature quantity based on upper and lower double block data in vertical direction of an image with respect to a field structure image when a judgment result of the image structure judging portion is a frame structure image; a storage area for storing block data extracted by the feature quantity extracting portion; an extracted data comparing portion for comparing the extracted block data and calculating a quantity of variation of a picture; and a scene change judging portion for judging a scene change using the quantity of variation calculated by the extracted data comparing portion.

With this structure, it is possible to detect the scene changes uniformly even if the frame structure images and the field structure images exist together on the time base. Additionally, it is possible to detect the scene changes without special consideration even when frame DCT or field DCT is used in the frame structure images.

According to a third aspect of the present invention, the scene change detecting apparatus includes a feature quantity extracting portion for extracting a feature quantity based on block data for one block independently of an image structure of an inputted compressed moving-picture; a storage area for storing block data extracted by the feature quantity extracting portion; an extracted data comparing portion for comparing a feature quantity by the use of double block data in vertical direction of an image with respect to a field structure image when an image from which a feature quantity has been extracted is a frame structure image; and a scene change judging portion for judging a scene change by the use of the quantity of variation calculated by the extracted data comparing portion.

With this structure, it is possible to detect the scene change uniformly even if the frame structure image and the field structure image are mixed on the time base. Additionally, it is possible to detect the scene change without special consideration even when frame DCT or field DCT is used in the frame structure image.

According to a fourth aspect of the present invention, the scene change detecting apparatus includes a field DCT encoding block number counting portion for counting a number of blocks that have undergone field DCT encoding when an image is a frame structure image; and a scene change judging portion for comparing the number of blocks with a threshold and judging a scene change that exists between fields.

With this structure, it is possible to detect also the scene change, which exists between fields and has been hitherto very difficult to detect, by counting the number of field encoding blocks and comparing the counted number with a threshold.

According to a fifth aspect of the present invention, the scene change detecting apparatus includes a scene change judging portion for judging a scene change; and a scene change interval retrieving portion for retrieving scene changes that exist at a start point and an end point of a specified particular interval among scene changes detected by the scene change judging portion.

With this structure, it is possible to easily extract some targets from a long inputted moving picture and omit useless scene change judgments to the utmost and, as a result, shorten the processing time.

According to a sixth aspect of the present invention, in addition to the second, third, fourth, or fifth aspect of the present invention, a threshold determined on the reference of a maximum quantity of variation of an image is included in thresholds that the scene change judging portion uses as a judging criterion of a scene change.

With this structure, it is possible to obtain detection results that have less detection fluctuation and are uniform even if the size of an image or the kind of data changes.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Scene change detection in the present invention does not depend on a prediction method. Therefore, scene changes can be detected regardless of the kind of prediction method is used or whether or not a prediction method exists. In all embodiments of the present invention, an inputted compressed moving-picture is described as relating to MPEG2. However, if the inputted image which is compressed with a compression method capable of using DCT and mixing both field and frame structures, a similar effect can be obtained. Therefore, a technique according to such a compression method can be included in the scope of the present invention. The present invention accepts input of a compressed moving-picture where field structure images and frame structure images exist together and detects a scene change in the inputted compressed moving-picture.

First Embodiment

Figure 1:
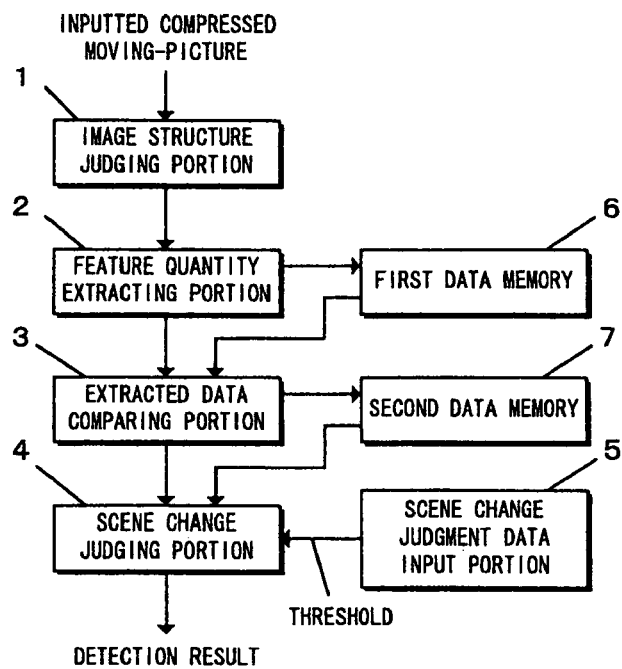
FIG. 1 is a block diagram of the scene change detection apparatus in a first embodiment of the present invention.

Referring now to FIG. 1, a bit stream, encoded according to MPEG2, is inputted as an inputted compressed moving-picture to the scene change detection apparatus. Information about the position of a scene change detected in the bit stream is output as a detection result from the scene change detection apparatus. As described in "Background of the Invention" of the specification, the encoding system of an inputted compressed moving-picture, the unit of encoding (frame/field structure), and DCT have each various forms, and, without being limited to a specific one, a plurality of forms can exist together on the time base.

Especially, no problem occurs even when field structure images and frame structure images exist alternately on the time base. The foregoing respects are adaptable, without changes, to the other embodiments that will be described later.

The inputted compressed moving-picture is first inputted to an image structure judging portion 1. The image structure judging portion 1 judges whether the image being input at the present is a field structure image or a frame structure image with reference to information about a specific region of the bit stream. Thereafter, the judgment result and the content of the bit stream are output to a feature quantity extracting portion 2 in the next step.

Figure 5:
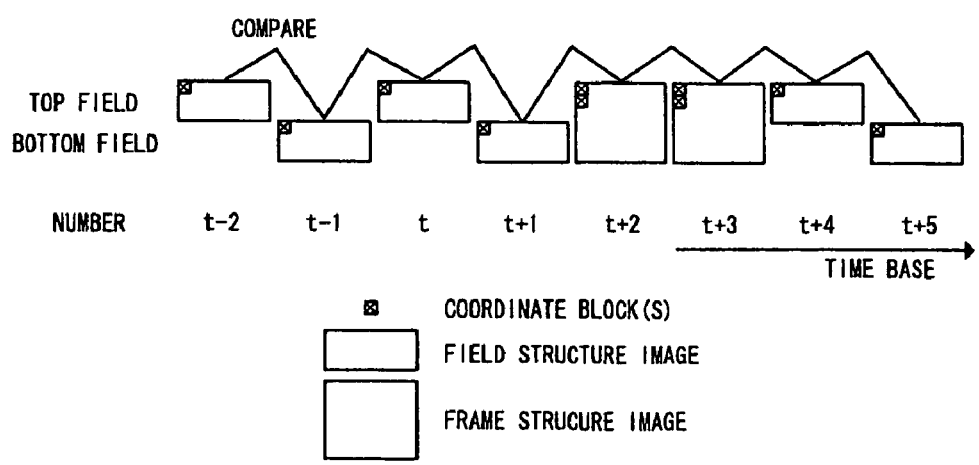
FIG. 5 is a model drawing of an inputted compressed moving-picture in the first embodiment of the present invention.
Figure 6:
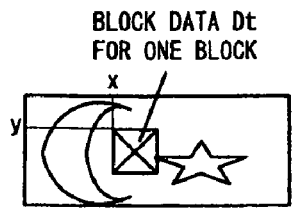
FIG. 6(a) is an explanatory drawing (top field) of a field structure image in the first embodiment of the present invention.
FIG. 6(b) is an explanatory drawing (bottom field) of the field structure image.
FIG. 6(c) is an explanatory drawing of a frame structure image.
Figure 6:
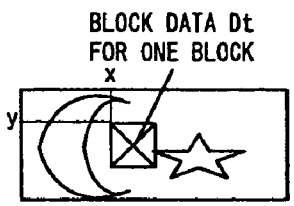

Referring now to FIGS. 5 and 6, feature quantity extracting portion 2 compares images on the left side of the figure, which are older on the time base, with those on the right side, which are new. A t(th) image ("t" indicates a numeral, and "th" is a suffix indicating an ordinal number) is designated as "image t". In this example, image t−2 to image t+1, and image t+4 to image t+5 are field structure images, whereas: image t+2 and image t+3 are frame structure images. That is, images t+1 to t+2 and images t+3 to t+4 have structural changes.

In the field structure image as in FIG. 6(a) (top field) and FIG. 6(b) (bottom field), block data Dt for one block is used as a feature quantity dt without changes (dt=Dt).

Figure 6C:
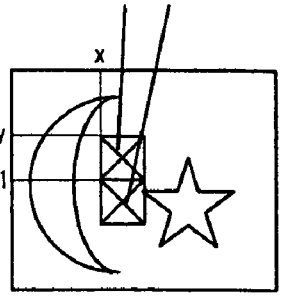

In the frame structure image as in FIG. 6(c), block data for two upper and lower blocks (block data Dtu and block data Dtb) is used, and the mean value thereof is used as the feature quantity dt (dt=(Dtu+Dtb)/2).

Herein, block data Dt, Dtu, and Dtb must be the same kind of data, and can use, for example, a brightness mean value in a block or other data that represents an image in the block.

As shown in FIGS. 6(a), 6(b), and 6(c), the frame structure image is twice as high from top to bottom as the field structure image. In order to compare the field structure image with the frame structure image, the block data Dt of block coordinates (x, y) and a pair of the block data Dtu of block coordinates (x, 2(y)) and the block data Dtb of block coordinates (x, 2(y+1)) are comparatively used in the field structure image.

When the feature quantities of block coordinates (x, y) in an image t and in an image s (typically, s=t+1) that are situated at different positions on the time base are represented as dt (x, y) and ds (x, y), respectively, a first quantity of variation R (t, s) in the image t and the image s is defined as follows. The first quantity of variation R (t, s) is approximately a simple difference between the image t and the image s.

[Numerical Expression 1]

$$R(t,s)=\Sigma|dt(x,y)-ds(x,y)|$$

Likewise, a second quantity of variation Q (t, s) is defined as follows. The second quantity of variation Q (t, s) is approximately a differential value of the image t and the image s.

[Numerical Expression 2]

$$Q(t,s)=2R(t,s)-R(t-1,t)-R(s,s+1)$$

It is possible to extract a position where a big change has appeared on an image and regard the position as a scene change by comparing the first quantity of variation R (t, s) with the first threshold that is empirically set beforehand. However, some images show continuous changes by extreme actions although the scenes are the same, and therefore there is a possibility that scene changes will be detected excessively if only the first quantity of variation R (t, s) is used. In this case, at the same time, by comparing the second quantity of variation Q (t, s) with a predetermined second threshold, it is possible to detect only the position where changes are discontinuous and a big change occurs which is interpreted as a scene change. This improves the reliability of detected scene changes.

It is noted that there is a case in which any one of the first quantity of variation R (t, s) and the second quantity of variation Q (t, s) suffices for some moving pictures. This permits both the variation quantities R (t, s) and Q (t, s) to be examined by giving appropriate weighting to them. The above expressions are merely examples, of course, and they can be replaced by other expressions that are equivalent to them and are capable of judging scene changes.

Figure 3:
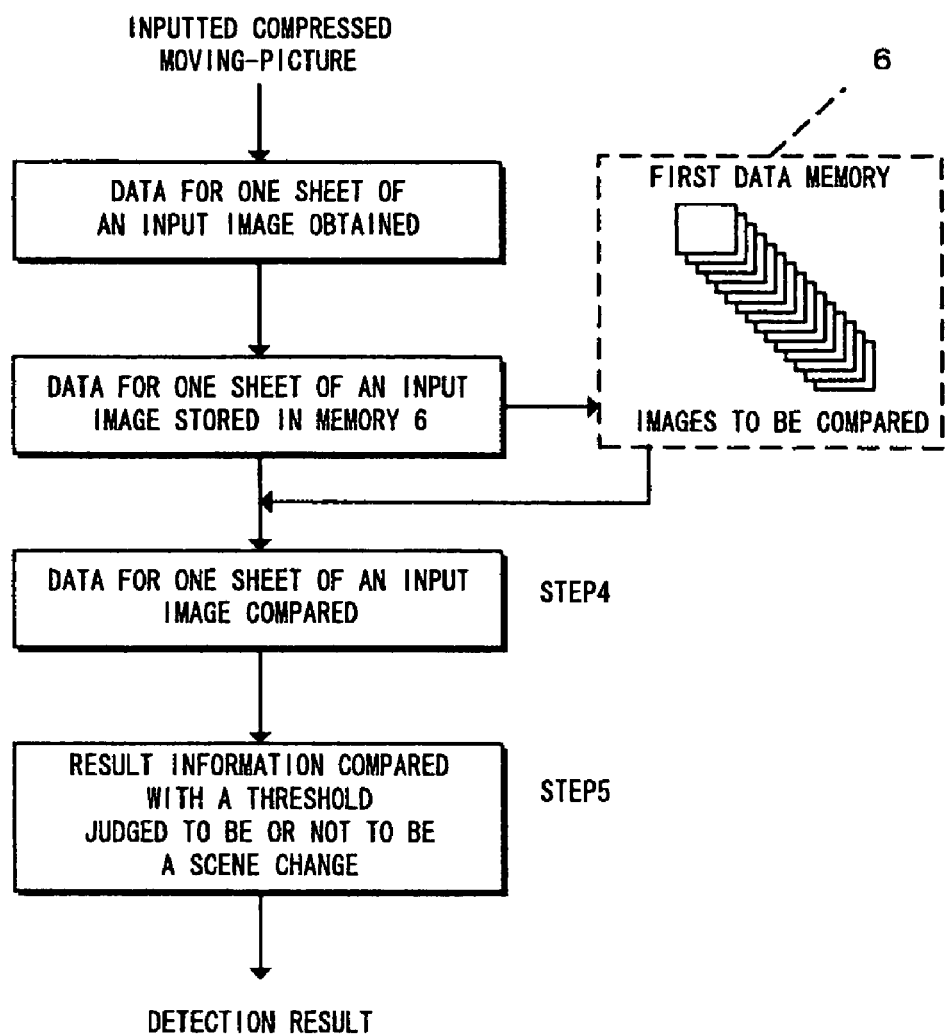
FIG. 3 is a detailed flowchart thereof.
Figure 4:
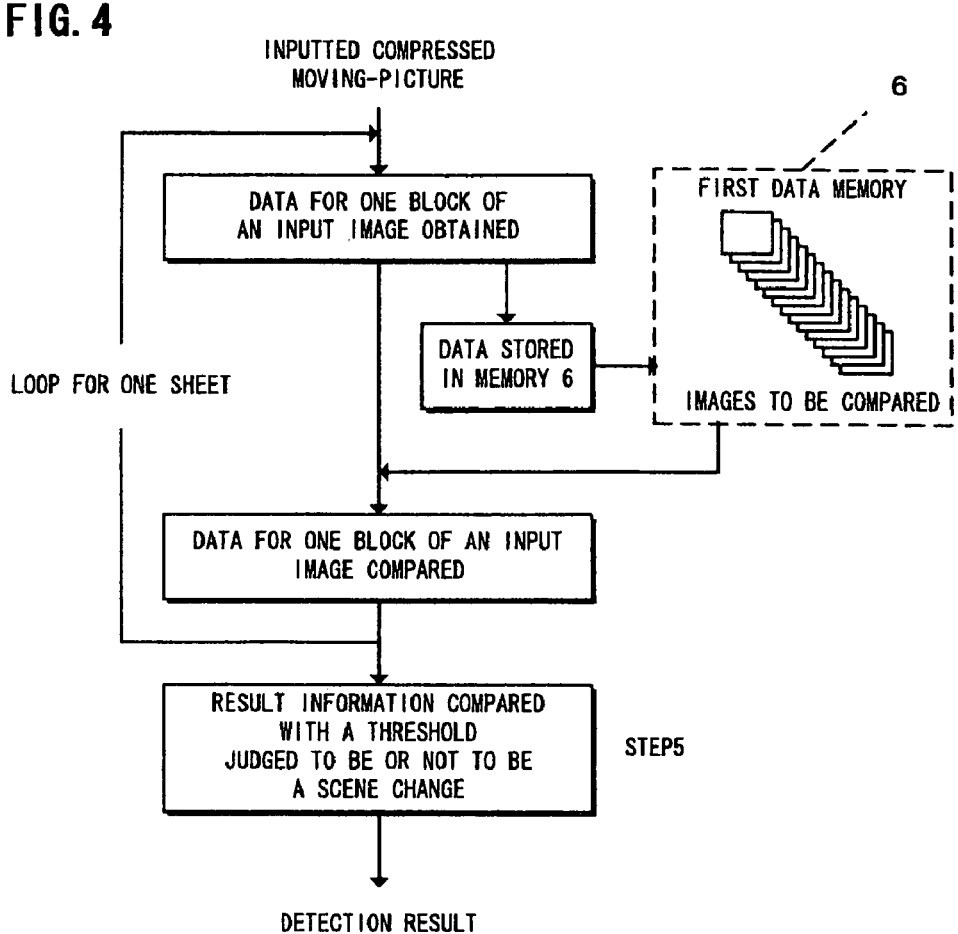
FIG. 4 is a detailed flowchart thereof.

The calculation of the first and second variation quantities R (t, s) and Q(t,s) can be carried out in such a way that all of the extracted data for one sheet of an input image are obtained as shown in FIG. 3. Thereafter, they are compared with an image to be compared. Preferably, a comparison with data corresponding to the same position of the image to be compared is simultaneously made when the data of one block (or, two or more blocks) are extracted as shown in FIG. 4. The reason is that the process of FIG. 4 increases processing speed. The data for one sheet in FIG. 3 or FIG. 4 means the data for one frame in the frame structure image and the data for one field in the field structure image. Thus, scene changes can be uniformly detected from a series of picture where field structure images and frame structure images exist together on the time base.

As shown in FIG. 1, the feature quantity dt that the extracting portion 2 has extracted and image information, such as frame numbers where the feature quantity dt has been extracted, are stored in a first data memory 6 correspondingly. The first data memory 6 corresponds to a storage area. First data memory 6 can be any suitable type of storage device such as, for example, random access memory or a hard disk drive.

When the feature quantity extracting portion 2 newly extracts a feature quantity dt and stores this new feature quantity dt in the first data memory 6, an extracted data comparing portion 3 next to the feature quantity extracting portion 2 makes a comparison between the new feature quantity dt and a feature quantity previously stored in the first data memory 6 (typically, immediately before this time) and calculates a quantity of variation between the feature quantities. Either the first quantity of variation R (t, s) or the second quantity of variation Q (t, s) can be calculated for this quantity of variation, but, desirably, both the quantities are calculated.

The extracted data comparing portion 3 stores the calculated quantity of variation as comparison result information in the second data memory 7, and, at the same time, stores image information, such as a frame number where the quantity of variation has been produced, correspondingly to the comparison result information.

A scene change judgment data input portion 5 retains a threshold that is used when a scene change is judged, and outputs the threshold to a scene change judging portion 4. This threshold includes a first threshold for the first quantity of variation R (t, s) and a second threshold for the second quantity of variation Q (t, S).

When the extracted data comparing portion 3 makes a comparison, the scene change judging portion 4 refers to the comparison result information stored in the second data memory 7. If the comparison produces a value which exceeds the threshold input from the scene change judgment data input portion 5, the scene change judging portion 4 judges that a scene change has occurred at this position, and thereafter outputs image information (i.e., position in a bit stream), such as a frame number relating to the comparison result information. If the comparison does not produce a value which exceeds the threshold, the scene change judging portion 4 may omit an output, or it may output a detection result to the effect that the threshold was not exceeded.

Figure 2:
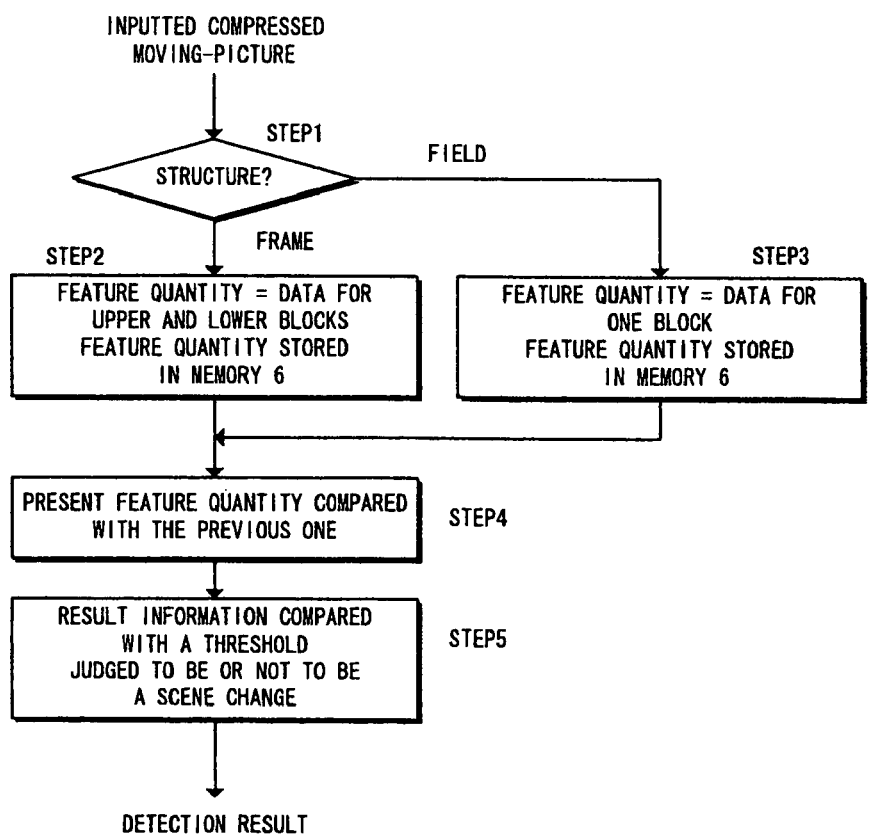
FIG. 2 is a flowchart of the scene change detection apparatus in the first embodiment of the present invention.

Referring now to FIG. 2, when an inputted compressed moving-picture reaches the image structure judging portion 1, the judging portion 1 judges whether the present image is a frame structure image or a field structure image (Step 1). If the present image is a frame structure image, the feature quantity extracting portion 2 extracts a value that uses data for two upper and lower blocks of the image in the vertical direction as a feature quantity and stores it in the first data memory 6 (Step 2). If the present image is a field structure image, the feature quantity extracting portion 2 extracts a value that uses data for one block as a feature quantity and stores it in the first data memory 6 (Step 3). In other words, the frame structure image uses double data in the vertical direction in comparison to the field structure image.

In Step 4, the extracted data comparing portion 3 compares the present feature quantity with the previous feature quantity, and stores comparison result information in the second data memory 7. Thereafter, in Step 5, the scene change judging portion 4 compares the comparison result information with a threshold that is inputted from the data input portion 5. If the comparison result is judged to represent a scene change, the scene change judging portion 4 outputs the position where the scene change has occurred as a detection result.

In this embodiment, the block data Dt for one block is used as the feature quantity dt in the field structure image, and a mean value of the block data Dtu and Dtb for two blocks in the vertical direction is used as the feature quantity dt in the frame structure image. However, if the comparison level of the data between the field structure image and the frame structure image is equal, other techniques can be used. For example, a comparison can be made between a feature quantity dt in which the block data for one block of the field structure image is doubled (dt=2×Dt) and another feature quantity dt in which the block data for two upper and lower blocks in the vertical direction are added (dt=Dtu+Dtb).

Additionally, in this embodiment, the data extracted in the field structure image one unit per block. The data extracted in the frame structure image is one unit per two blocks. However, if the data extracted from the frame structure image is double data in the vertical direction that exists at the position corresponding to the data extracted in the field structure image, a scene change can be detected in the same way. In other words, when the data of the field structure image N block is extracted as a feature quantity, all that is required is to extract double data from 2×N blocks in the vertical direction of a corresponding position from the frame structure image as a feature quantity.

As a result, scene changes can be uniformly detected from a compressed moving-picture-in which frame structure images and field structure images exist together. Scene changes can be detected without giving special consideration even when frame DCT or field DCT is used in the frame structure image. Since this technique does not depend on a prediction method, it is indifferent the kind of prediction method which may be used. Accordingly, the kind of prediction method is withdrawn from consideration, while permitting detection of a desired scene change regardless of whether of not a prediction method exists.

Second Embodiment

Figure 7:
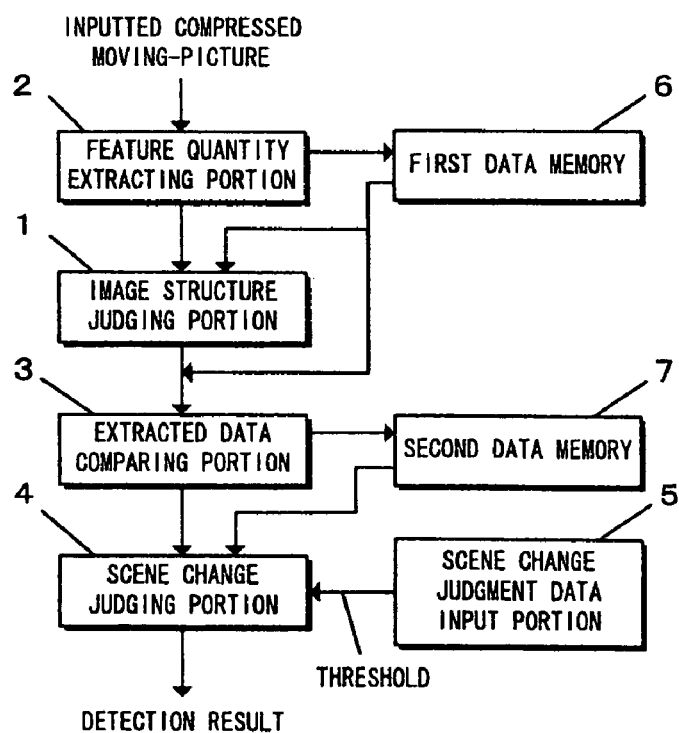
FIG. 7 is a block diagram of the scene change detection apparatus in a second embodiment of the present invention.
Figure 8:
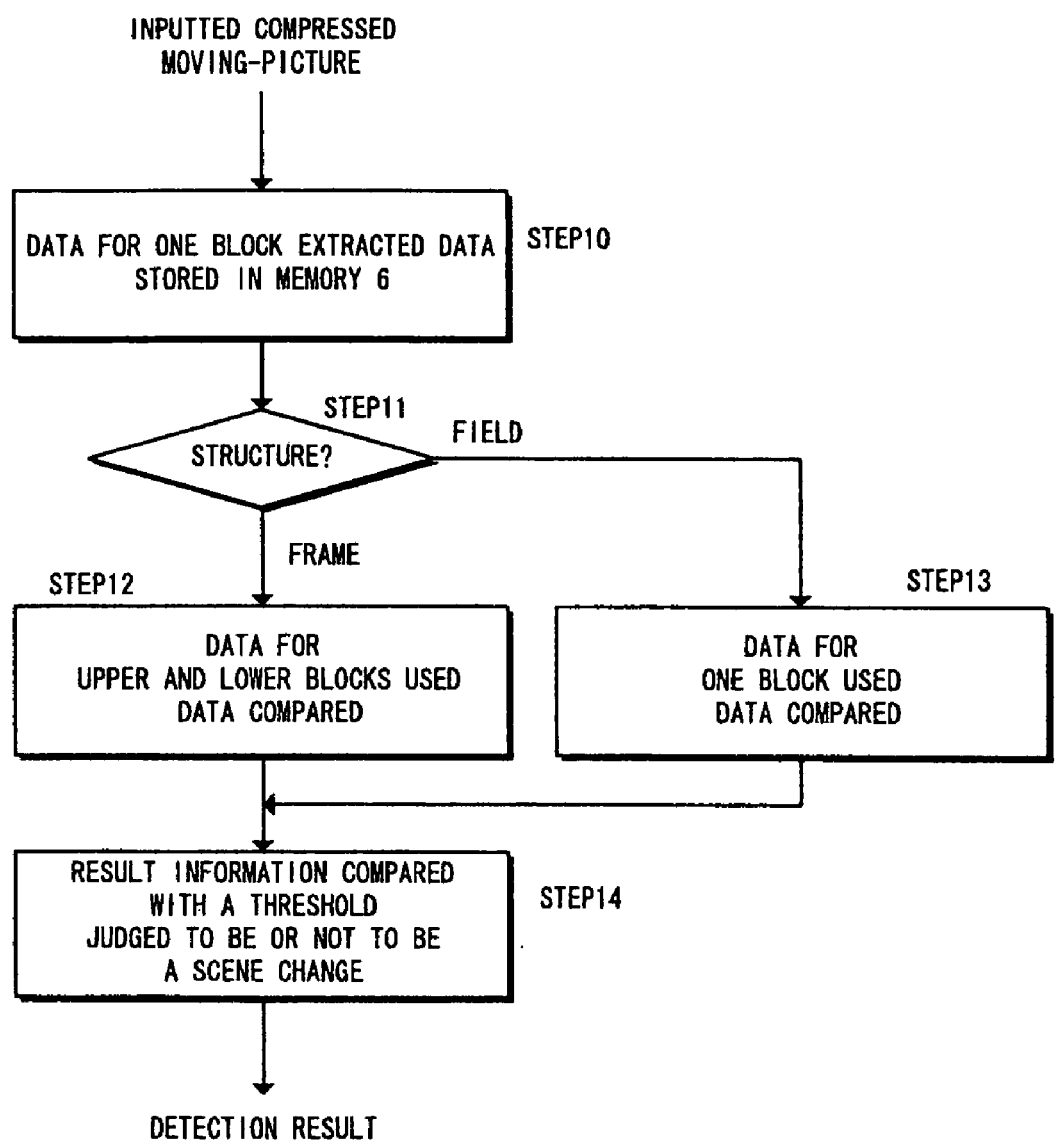
FIG. 8 is a flowchart of the scene change detection apparatus in the second embodiment of the present invention.

Referring now to FIGS. 7 and 8, in a second embodiment of the invention, the feature quantity extracting portion 2 is positioned upstream of the image structure judging portion 1, in contrast with the arrangement of the first embodiment in FIG. 1. In addition, the feature quantity extracting portion 2 in this embodiment is different in that the feature quantity is extracted from the block data every block for the entire image whether an inputted compressed moving-picture is composed of frame structure images or is composed of field structure image (Step 10).

The image structure judging portion 1 is disposed before the extracted data comparing portion 3. The extracted data comparing portion 3 examines the structure of an image inputted at this time, and, if the structure is a frame structure image, the extracted data comparing portion 3 uses data for two upper and lower blocks in the vertical direction of the image, and compares the data (Step 12). On the other hand, if it is a field structure image, the extracted data comparing portion 3 uses data for one block and compares the data (Step 13). The comparison herein is made in the same way as in the first embodiment.

Referring again to FIG. 5, when a comparison is made between image t and image t+1, block data at the same position on the image are compared because both the images are each a field structure image.

If a comparison is made between image t+1 and image t+2, data obtained from block coordinates (x, y) in image t+1 is compared with data obtained from block coordinates (x, 2(y)) and block coordinates (x, 2(y+1)) in image t+2, because image t+2, is a frame structure image.

For example, if the data obtained from block coordinates (x, y) in image t+1 is defined as A, data obtained from block coordinates (x, 2(y)) and block coordinates (x, 2(y+1)) is defined as B and C, respectively, and the absolute value of a difference between data A and a mean value of data B and C is made a quantity of variation. By calculating this quantity of variation in the entire image, the quantity of variation of two images is obtained.

In this embodiment, a mean value for two blocks in the vertical direction is used as the data of the frame structure image. However, this may be merely performed by addition. In this case, all that is required is to normalize data in such a way that, for example, data of a corresponding field structure image is doubled. Specifically, an appropriate way is to define the absolute value of a difference between a double value of data A and a sum of data B and C as a quantity of variation.

The remainder of functions are the same as in the first embodiment in FIG. 1.

Third Embodiment

Figure 9:
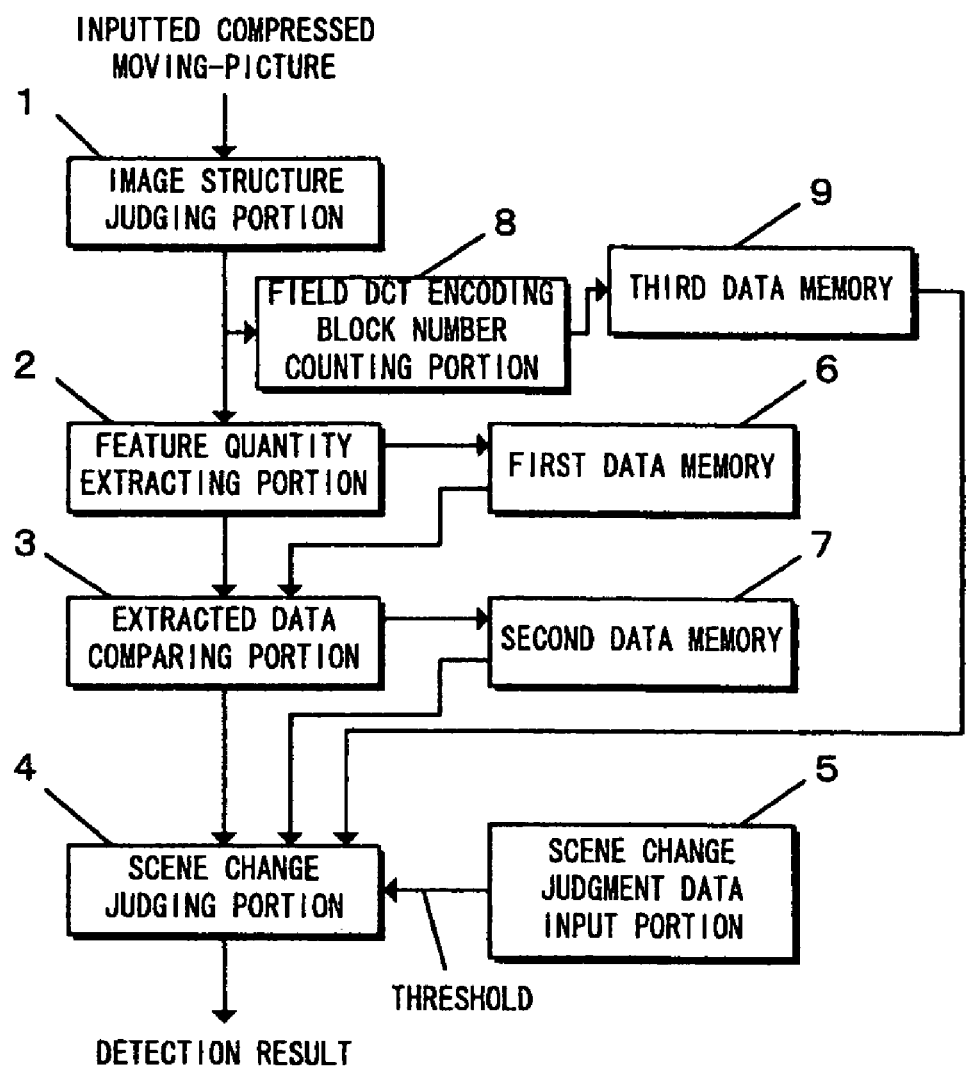
FIG. 9 is a block diagram of the scene change detection apparatus in a third embodiment of the present invention.
Figure 10:
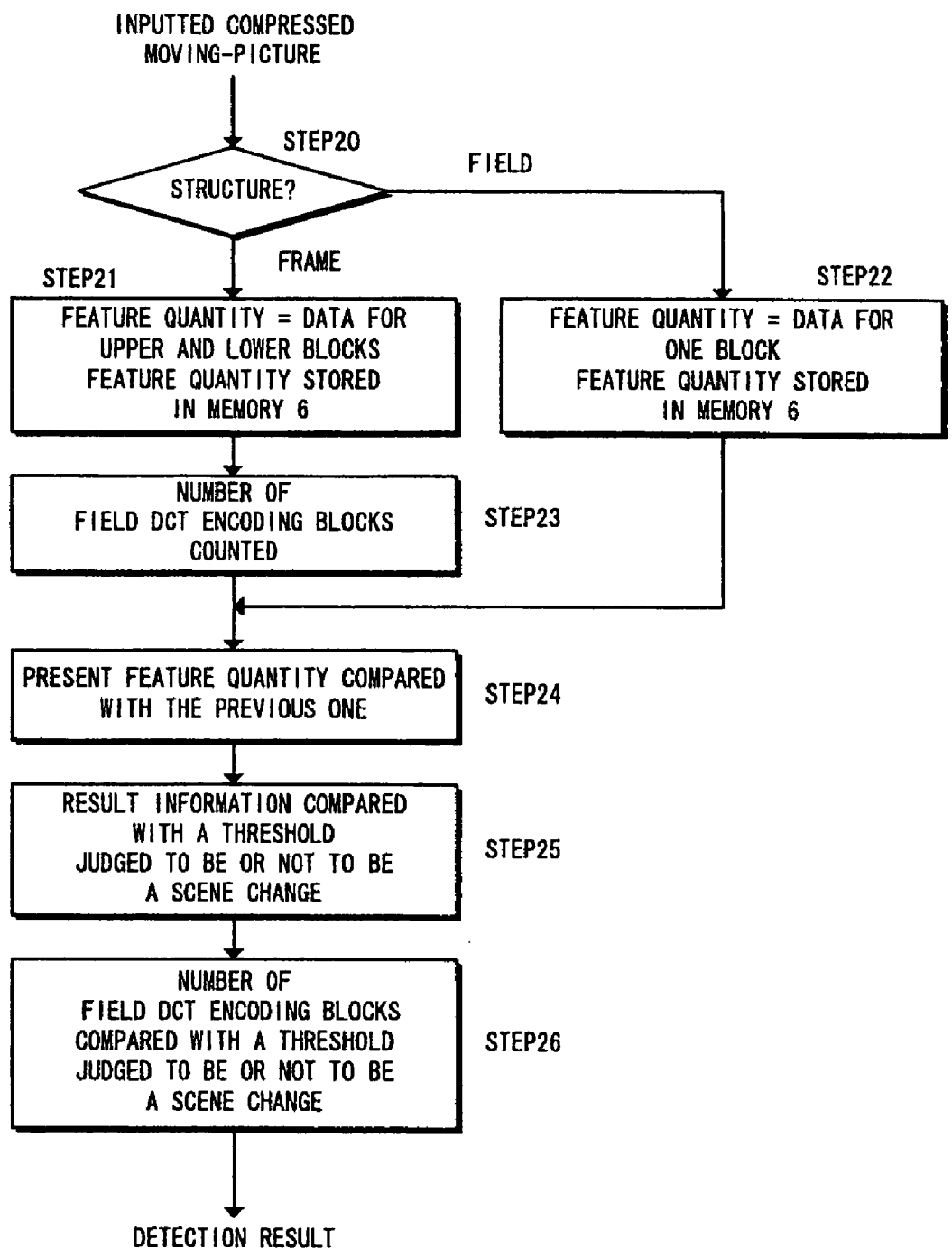
FIG. 10 is a flowchart of the scene change detection apparatus in the third embodiment of the present invention.

Referring now to FIGS. 9 and 10, a scene change detection apparatus according to a third embodiment of the present invention, when compared to the first embodiment in FIG. 1, adds a field DCT encoding block number counting portion 8 and a third data memory 9. If a judgment result obtained by the image structure judging portion 1 is a frame structure image, the field DCT encoding block number counting portion 8 judges whether the encoding uses frame DCT or field DCT, and counts the number of macro blocks (the number of blocks is also acceptable) where the field DCT encoding in one field is performed. And, the number of field DCT encoding blocks that the field DCT encoding block number counting portion 8 has counted is stored in the third data memory 9.

Therefore, as shown in FIG. 10, when an inputted compressed moving-picture first arrives at the image structure judging portion 1, the judging portion 1 judges whether the present image is a frame structure image or a field structure image (Step 20). If the present image is a frame structure image, the feature quantity extracting portion 2 extracts the value that uses block data for two upper and lower blocks of the image in the vertical direction as a feature quantity, and stores it in the first data memory 6 (Step 21). Thereafter, the field DCT encoding block number counting portion 8 counts the number of field DCT encoding blocks, and stores the block number in the third data memory 9 (Step 23). The order of Steps 21 and 23 may be changed.

On the other hand, if the present image is a field structure image, the feature quantity extracting portion 2 extracts the value that uses block data for one block as a feature quantity, and stores it in the first data memory 6 (Step 22). That is, the frame structure image uses double data in the vertical direction in comparison to the field structure image.

Thereafter, in Step 24, the extracted data comparing portion 3 compares the present feature quantity with the previous feature quantity, and stores comparison result information in the second data memory 7. Thereafter, in Step 25, the scene change judging portion 4 compares the comparison result information with a threshold inputted from the scene change judgment data input portion 5, and examines whether the comparison result can be judged to be a scene change. Thereafter, in Step 26, the scene change judging portion 4 compares the block number stored in the third data memory 9 with the threshold, and examines whether it can be judged to be a scene change. When the scene change judging portion 4 judges it to be a scene change either in Step 25 or Step 26, the scene change judging portion 4 outputs the position where the scene change has occurred as a detection result.

Figure 11:
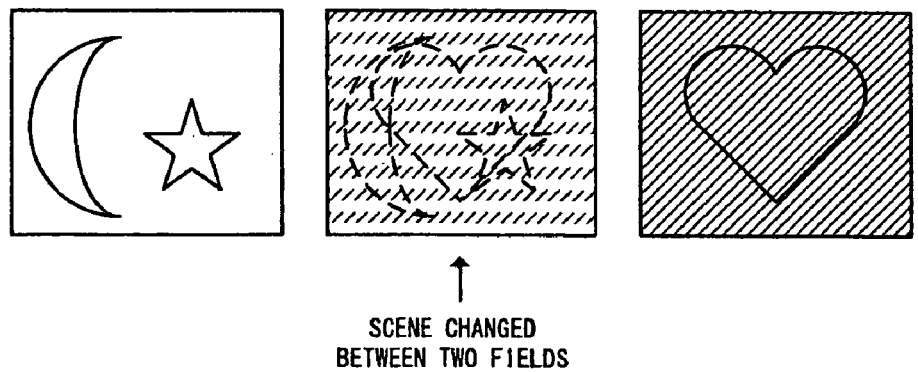
FIG. 11 is an explanatory drawing of a scene change that exists between fields in the third embodiment of the present invention.

Referring momentarily to FIG. 11, when two scenes are mixed in a field as in FIG. 11, the quantity of variation among an inputted image, the previous image, and the subsequent image is often reduced. This causes detection errors. However, as described in "Background of the Invention", the compressibility rises by performing field DCT in the input image.

Therefore, where field DCT is frequently used in a frame, the correlation between an odd field and an even field in the frame can be regarded as low. For this reason, the feature quantity extracting portion 2 counts the number by which the field DCT encoding is performed, and adds this to the subject of comparative study as a third quantity of variation in the frame.

The extracted data comparing portion 3 is the same as those in the first and second embodiments, but the scene change judging portion 4, in addition to the judgments in the first and second embodiments, judges that there is a scene change between fields of a frame if the third quantity of variation is larger than the third threshold that is set beforehand for the third quantity of variation when the third quantity of variation is compared with the third threshold.

As described above, the scene change (shown in FIG. 11), which exists between two fields of a frame structure image and has been hitherto very difficult to detect, can be detected by counting the number by which field DCT is used.

Further, in this embodiment, concerning the threshold that the input portion 5 outputs to the scene change judging portion 4, on the condition that the maximum quantity of variation of an image is the reference (100%), the threshold is determined to be a predetermined percent of this reference.

For example, in comparison images A and B, if the possible minimum value and maximum value of the data of one block to be compared is 0 and 255, respectively, the maximum quantity of variation of one block is 255. And, if the number of blocks used to compare images is 1320, the maximum quantity of variation of the entire image is 255× 1320=336600. This quantity of variation is determined as the reference (100%). Preferably, the threshold herein is, for example, about 3% (10098) through 10% (33660).

The threshold changes as the number of data to be used or the maximum quantity of variation of data changes, of course. Herein, the ratio of the threshold to the reference are made constant.

Thereby, it is possible to control the fluctuation of detection and obtain almost the same detection result even if the image size (length×width) changes or the kind of the data used for judgment changes.

Fourth Embodiment

Figure 12:
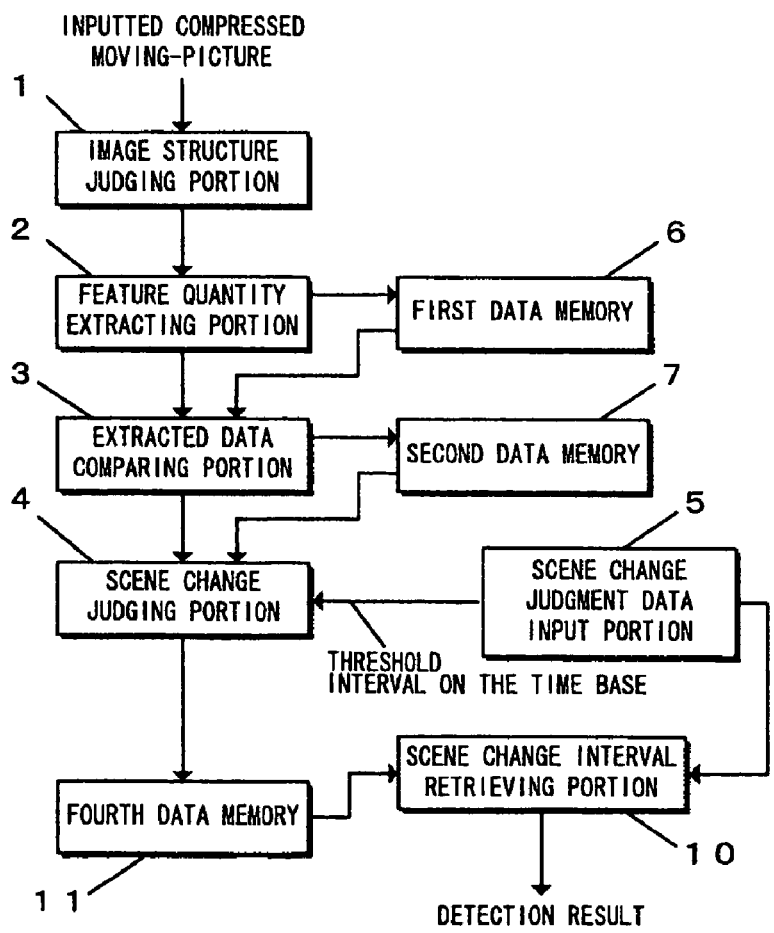
FIG. 12 is a block diagram of the scene change detection apparatus in a fourth embodiment of the present invention.
Figure 13:
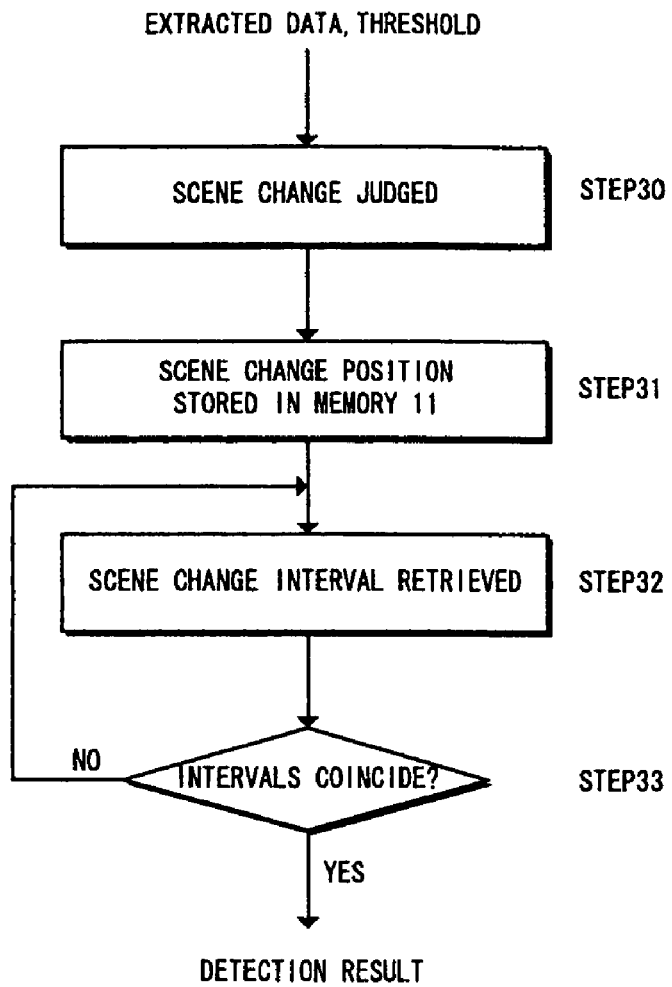
FIG. 13 is a flowchart of the scene change detection apparatus in the fourth embodiment of the present invention.

Referring now to FIGS. 12 and 13, a fourth embodiment of the invention includes a scene change judging portion 4 which does not output a detection result directly, but includes a fourth data memory 11 in which data from the scene change judging portion 4 is stored temporarily.

Additionally, an interval on the time base from a scene change to a target scene that is a reference is set in the scene change judgment data input portion 5. A scene change interval retrieving portion 10 is also added. The scene change interval retrieving portion 10 calculates an interval on the time base of the respective scene change position information stored in the fourth data memory 11, and compares the calculated interval with an interval given from the scene change judgment data input portion 5.

Therefore, as shown in FIG. 13, the scene change judging portion 4 searches for a scene change in the same way as in the foregoing embodiments (Step 30). When the scene change judging portion 4 finds a scene change, this scene change position information is stored in the fourth data memory 11 (Step 31).

Thereafter, the scene change interval retrieving portion 10 accesses the fourth data memory 11 and examines an interval between scene changes (Step 32). If a pair of scene changes that coincide with the interval given from the scene change judgment data input portion 5 are found, the retrieving portion 10 outputs position information about the pair, which is comprised of the head and end of the found scene change, as a detection result (Step 33).

For example, if it is desired to detect a 30-second scene from a 5-minute picture, scene change detection is performed over the entire picture, and the result is stored in the fourth data memory 11. Thereafter, the data is searched for a scene change pair with just a 30-second interval between the scene changes. The resulting data, representing the 30-second scene is output as a detection result.

Figure 14:
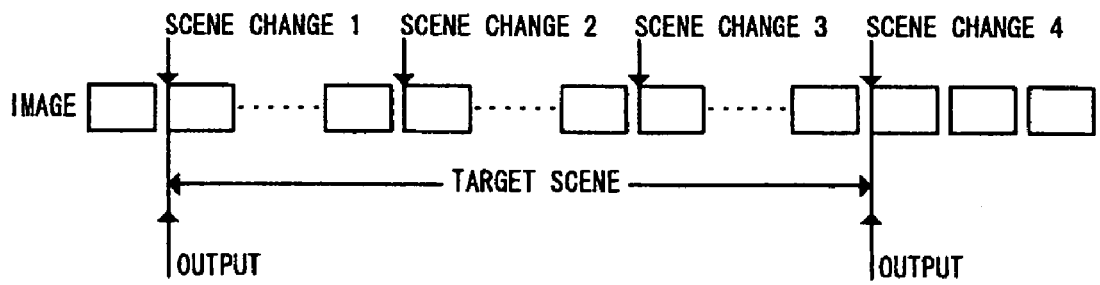
FIG. 14 is a model drawing of a scene change in the fourth embodiment of the present invention.
Figure 15A:
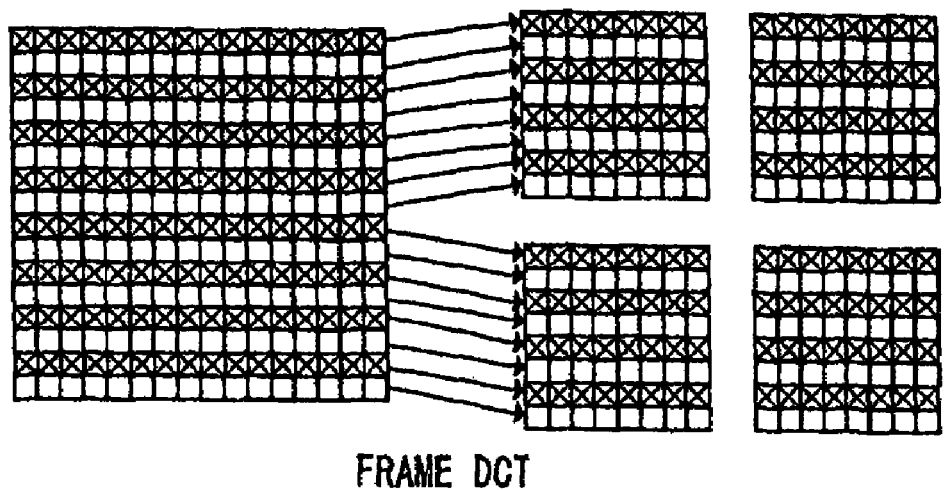
FIG. 15(a) is an explanatory drawing of a macro block structure in conventional frame DCT.
Figure 15B:
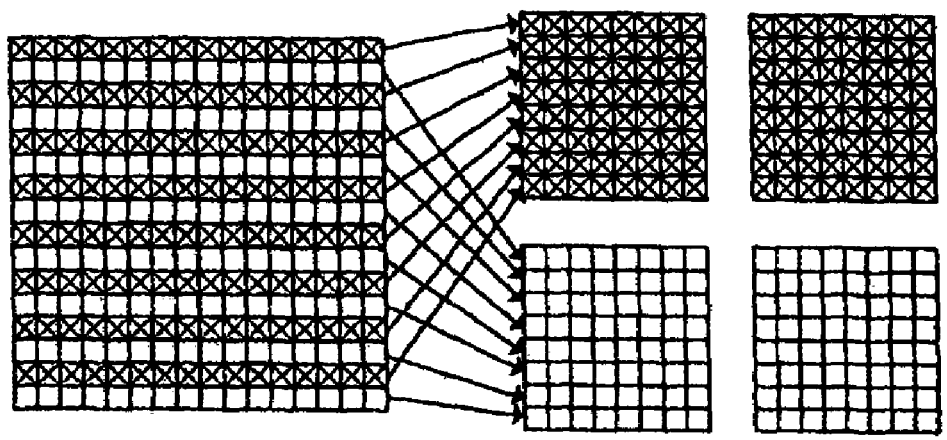
FIG. 15(b) is an explanatory drawing of a macro block structure in conventional field DCT.

Referring to FIG. 14 as an example, when scene change 1 to scene change 4 are detected, if a 30-second interval is found between scene change 1 and scene change 4, the pair of scene change 1 and scene change 4 is output as a detection result.

From this, it becomes possible to, for example, extract only commercial break parts from a large number of images obtained from television broadcasting, etc., or extract news or a program that has a fixed broadcasting hour.

Further, when a certain scene change is found, it is possible to omit the scene change judgment to a given interval from it and shorten processing time by omitting unnecessary detection operations with the utmost caution.

For example, 15 seconds may be given as target time when only a 15-second commercial break is detected from a long picture. The scene change interval retrieving portion 10 judges whether a scene change is detected in a frame after 15 seconds from a frame detected as a scene change by calculation. Only when the scene change is detected after 15 seconds is the output of the frame and its companion frame 15-seconds later as required-scene-changes. The 15-second duration is detected as the scene of the target. In order to retrieve a target scene subsequently, a judgment is formed about whether a scene change occurs after 15 seconds from the last detected scene change. If no scene change is detected at the 15-second point, scene change judgment is continued from the next frame. The point where a scene change is detected becomes a target scene from which time is counted to 15 seconds.

Referring to FIG. 14 as an example, if scene change 1 is detected and there is scene change 4 just after 15 seconds, it is possible to skip the judgments (useless judgments) about scene change 2 and scene change 3 that exist during the 15 seconds.

Thus, in this embodiment, a judgment is formed about whether a subsequent frame having an interval by the time given as a target duration after the first scene change is found is a scene change or not. Therefore, it is possible to omit the processing for a scene change judgment in a detected target scene, thus shortening the processing time.

It is noted that "recording medium" mentioned in this specification includes a case in which the program is spread over a plurality of recording media and distributed. Additionally, regardless of whether the program is a part of an operating system or not, if the program causes some of the functions thereof to be performed by various processes or threads (DLL, OCX, Active X, etc., (including the trademarks of Microsoft Corporation)), "recording medium" includes a case in which a part concerning the functions performed by them is not stored in the recording medium.

A standalone type system is shown in FIG. 1, FIG. 7, FIG. 9, and FIG. 12. Instead of a standalone type system, a server/client type system can be used. In other words, instead of a case in which all elements appearing in the specification are contained in only one terminal unit, a case is allowable in which one terminal unit is a client, and all of or a part of the elements exist in a server or network connectable to the client.

A case is also allowable in which the server side contains almost all the elements of FIG. 1, FIG. 7, FIG. 9, and FIG. 12, and the client side has, for example, only a WWW browser. Normally, certain information located on the server is distributed to the client through a network. In this case, when necessary information is located on the server, a storage device of the server is the "recording medium" mentioned above. When the information is located on the client, a storage device of the client is the "recording medium".

The programming language used is not an inventive part of the present disclosure. The program can be compiled in machine language, or it can exist as an intermediate code interpreted by the aforementioned process or thread, a case in which at least a resource and a source code are stored on the "recording medium", and a compiler and a linker that can generate the application of a machine language from them are located on the "recording medium", or a case in which at least the resource and the source code are stored on the "recording medium", and an interpreter that can generate the application of the intermediate code from them is located on the "recording medium".

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for detecting a scene change in a compressed moving-picture comprising:
   an image structure judging unit operable to judge an image structure of an inputted compressed moving-picture;
   a feature quantity extracting unit operable to extract a feature quantity based on top and bottom double data in vertical direction of an image with respect to a field structure image when a judgment result of the image structure judging unit is a frame structure image;
   a storage area for storing data extracted by the feature quantity extracting unit;
   an extracted data comparing unit operable to compare the extracted data and calculating a quantity of variation of a picture; and
   a scene change judging unit operable to judge a scene change by the use of the quantity of variation calculated by the extracted data comparing unit.

2. An apparatus for detecting a scene change in a compressed moving-picture comprising:
   a feature quantity extracting unit operable to extract a feature quantity based on block data for one block independently of an image structure of an inputted compressed moving-picture;
   a storage area for storing block data extracted by the feature quantity extracting unit;
   an extracted data comparing unit operable to compare a feature quantity by the use of double block data in vertical direction of an image with respect to a field structure image when an image from which a feature quantity has been extracted is a frame structure image; and
   a scene change judging unit operable to judge a scene change by the use of the quantity of variation calculated by the extracted data comparing unit.

3. An apparatus for detecting a scene change in a compressed moving-picture comprising:
   a scene change judging unit operable to judge a plurality of scene changes;
   a measuring unit operable to select a plurality of pairs of the scene changes from the plurality of scene changes and to measure an interval length for each of the plurality of pairs; and
   a detecting unit operable to detect, from the plurality of pairs a pair of scene changes having an interval length equal to a predefined interval length.

4. An apparatus for detecting a scene change in a compressed moving-picture as set forth in claim 1, wherein a threshold determined on the reference of a maximum quantity of variation of an image is included in thresholds that the scene change judging unit uses as a criterion of a scene change.

5. An apparatus for detecting a scene change in a compressed moving-picture as set forth in claim 2, wherein a threshold determined on the reference of a maximum quantity of variation of an image is included in thresholds that the scene change judging unit uses as a criterion of a scene change.

6. The apparatus for detecting a scene change in a compressed moving-picture as set forth in claim 3, wherein the judging unit is further operable to use a threshold as a criterion of a scene change; and
   the threshold includes a maximum quantity of variation of an image.

7. A method of detecting a scene change in a compressed moving-picture comprising the steps of:
   judging step of judging an image structure of an inputted compressed moving-picture;
   extracting step of extracting a feature quantity based on top and bottom double data in vertical direction of an image with respect to a field structure image when a judgment result of the image structure judging step is a frame structure image;
   storing data extracted by the feature quantity extracting step in a storage area;
   comparing the extracted block data and calculating a quantity of variation of a picture; and
   judging a scene change by the use of the quantity of variation calculated by the extracted data comparing step.

8. A method of detecting a scene change in a compressed moving-picture comprising the steps of:
   extracting a feature quantity based on block data for one block independently of an image structure of an inputted compressed moving-picture;
   storing block data extracted by the feature quantity extracting step in a storage area;
   comparing a feature quantity by the use of double block data in vertical direction of an image with respect to a field structure image when an image from which a feature quantity has been extracted is a frame structure image; and
   judging a scene change by the use of the quantity of variation calculated by the extracted data comparing step.

9. A method of detecting a scene change in a compressed moving-picture comprising the steps of:
   judging a plurality of scene changes;
   selecting a plurality of pairs of scene changes from the plurality of scene changes and measuring an interval length for each of the plurality of pairs of scene changes; and
   detecting, from the plurality of pairs of scene changes, a pair of scene changes having an interval length equal to a predefined interval length.

10. A recording medium that computer-readably records a program for detecting a scene change in a compressed moving-picture, the program comprising:
    an image structure judging step of judging an image structure of an inputted compressed moving-picture;
    a feature quantity extracting step of extracting a feature quantity based on top and bottom double data in vertical direction of an image with respect to a field structure image when a judgment result of the image structure judging step is a frame structure image;
    a storage area for storing data extracted by the feature quantity extracting step;
    an extracted data comparing step of comparing the extracted data and calculating a quantity of variation of a picture; and a scene change judging step of judging a scene change by the use of the quantity of variation calculated by the extracted data comparing step.

11. A recording medium that computer-readably records a program for detecting a scene change in a compressed moving-picture, the program comprising:
- a feature quantity extracting step of extracting a feature quantity based on block data for one block independently of an image structure of an inputted compressed moving-picture;
- a storage area for storing block data extracted by the feature quantity extracting step;
- an extracted data comparing step of comparing a feature quantity by the use of double block data in vertical direction of an image with respect to a field structure image when an image from which a feature quantity has been extracted is a frame structure image; and
- a scene change judging step of judging a scene change by the use of the quantity of variation calculated by the extracted data comparing step.

12. A recording medium that computer-readably records a program for detecting a scene change in a compressed moving-picture, the program comprising:
- a scene change judging step of judging a scene change;
- a measuring step of selecting a plurality of pairs of the scene changes from the plurality of scene changes and measuring an interval lenght for each of the plurality of pairs; and
- a detecting step of detecting, from the plurality of pairs of scene changes, a pair of scene changes having an interval length equal to a predefined interval length.

* * * * *

UNITED STATES PATENT AND TRADEMARK OFFICE
CERTIFICATE OF CORRECTION

| | |
|---|---|
| PATENT NO. | : 7,031,385 B1 |
| APPLICATION NO. | : 09/677802 |
| DATED | : April 18, 2006 |
| INVENTOR(S) | : Yukiko Inoue et al. |

It is certified that error appears in the above-identified patent and that said Letters Patent is hereby corrected as shown below:

On the Face of the Patent:

Col. 2, Foreign Patent Documents, Line 1, after "3/1995" insert -- H04N 9/77 --.

Col. 2, Foreign Patent Documents, Line 2, after "5/1995" insert -- G06F 17/30 --.

Col. 2, Foreign Patent Documents, Line 3, after "12/1997" insert -- HO4N 5/92 --.

Col. 2, Foreign Patent Documents, Line 4, after "12/1998" insert -- H04N 5/91 --.

Col. 2, Attorney, Agent, or Firm, Line 1, after "Darby & Darby" insert -- P.C. --.

In the Figures:

Sheet 3 of 10, FIG. 5, Line 8, delete "STRUCURE" and insert -- STRUCTURE --.

In the Specification:

Column 1, Line 34, after "color" delete ",".

Column 2, Line 49, after "are" delete ",".

UNITED STATES PATENT AND TRADEMARK OFFICE
CERTIFICATE OF CORRECTION

| | |
|---|---|
| PATENT NO. | : 7,031,385 B1 |
| APPLICATION NO. | : 09/677802 |
| DATED | : April 18, 2006 |
| INVENTOR(S) | : Yukiko Inoue et al. |

It is certified that error appears in the above-identified patent and that said Letters Patent is hereby corrected as shown below:

Column 2, Line 52, delete "judgement" and insert -- judgment --.

Column 6, Line 20, after "whereas" delete ":".

Column 7, Line 62, delete "S)." and insert -- s). --.

Column 8, Line 58, after "picture" delete "-in" and insert -- in --.

Column 9, Line 33, after "t+2" delete ",".

In the Claims:

Column 14, Line 12 (claim 7), delete "judging step of" before "judging an".

Column 14, Line 14 (claim 7), delete "extracting step of" before "extracting a".

Column 14, Line 53 (claim 10), delete "A" and insert -- A method for detecting a scene change in --.

Column 14, Line 54 (claim 10), delete "for detecting a scene change in" and insert -- containing --.

Column 14, Line 55 (claim 10), after "picture," delete "the program".

Column 14, Line 56 (claim 10), delete "an image structure judging step of" before "judging".

UNITED STATES PATENT AND TRADEMARK OFFICE
CERTIFICATE OF CORRECTION

PATENT NO. : 7,031,385 B1
APPLICATION NO. : 09/677802
DATED : April 18, 2006
INVENTOR(S) : Yukiko Inoue et al.

It is certified that error appears in the above-identified patent and that said Letters Patent is hereby corrected as shown below:

Column 14, Line 58 (claim 10), delete "a feature quantity extracting step of" before "extracting".

Column 14, Line 63 (claim 10), delete "a storage area for" before "storing".

Column 14, Line 65 (claim 10), delete "an extracted data comparing step of" before "comparing".

Column 15, Line 1 (claim 10), delete "a scene change judging step of" before "judging".

Column 15, Lines 1-2 (claim 10), delete "by the use of" and insert -- when --.

Column 15, Lines 2-3 (claim 10), delete "calculated by the extracted data comparing step" and insert -- exceeds a threshhold value --.

UNITED STATES PATENT AND TRADEMARK OFFICE
CERTIFICATE OF CORRECTION

| | | |
|---|---|---|
| PATENT NO. | : 7,031,385 B1 | |
| APPLICATION NO. | : 09/677802 | |
| DATED | : April 18, 2006 | |
| INVENTOR(S) | : Yukiko Inoue et al. | |

It is certified that error appears in the above-identified patent and that said Letters Patent is hereby corrected as shown below:

Column 15, Line 4 (claim 11), delete "A" and insert -- A method for operating a --.

Column 15, Line 7 (claim 11), delete "a feature quantity extracting step of" before "extracting".

Column 15, Line 11 (claim 11), delete "a storage area for" before "storing".

Column 15, Line 13 (claim 11), delete "an extracted data comparing step of" before "comparing".

Column 16, Lines 1-2 (claim 11), delete "a scene change judging step of judging a scene change by the use of the quantity" and insert -- judging a scene change based on an amount --.

Column 16, Line 10 (claim 12), delete "lenght" and insert -- length --.

Signed and Sealed this

Twelfth Day of September, 2006

JON W. DUDAS
*Director of the United States Patent and Trademark Office*